United States Patent Office 2,863,911
Patented Dec. 9, 1958

2,863,911

PRODUCTION OF ORGANIC OXYGENATED COMPOUNDS FROM UNSATURATED HYDROCARBONS

Karl Büchner, Oberhausen-Sterkrade, and Otto Roelen, Oberhausen-Holten, Germany, assignors to Ruhrchemie Aktiengesellschaft, Oberhausen-Holten, Germany, a corporation of Germany No Drawing. Application January 28, 1955
Serial No. 484,848

Claims priority, application Germany January 30, 1954

2 Claims. (Cl. 260—497)

This invention relates to improvements in the production of oxygenated organic compounds from unsaturated hydrocarbons.

It is known that olefins may be converted with carbon monoxide and alcohols into esters. If in this conversion an insufficient amount of carbon monoxide is used, then ketones are formed in addition to the esters. It is also known that olefins may be converted with carbon monoxide and water to form acids. This conversion is effected under high pressures of, for example, 700 atmospheres and at relatively high temperatures with the use of catalysts which consist of materials having a large surface area and acid compounds, such as phosphoric acid, heteropoly acid, boron fluoride or metal halides (see Ziegler "Praeparative Organische Chemie," part I (1948), page 124). The olefins may also be converted with stoichiometric amounts of metal carbonyls, and preferably nickel carbonyl. Instead of the metal carbonyls, catalysts may be used which form metal carbonyls during the reaction.

Depending upon the simultaneous use of water, alcohols, mercaptan, ammonia, amines or carboxylic acid, the conversion of the olefins with carbon monoxide proceeds in accordance with the following equations:

$$H_2C=CH_2+CO+H_2O \rightarrow CH_3-CH_2-COOH$$
$$H_2C=CH_2+CO+ROH \rightarrow CH_3-CH_2-COOR$$
$$H_2C=CH_2+CO+RSH \rightarrow CH_3-CH_2-COSR$$

Simultaneously with these main reactions, side reactions take place, which, for example, result in the formation of aldehydes and ketones.

Both of these reactions lead to the formation of carbon dioxide (see Ziegler, supra, page 129). For the production of aldehydes, the following equations apply:

$$CO+H_2O \rightarrow CO_2+H_2$$
$$R-CH=CH_2+CO+H_2 \rightarrow R-CH_2-CH_2-CHO$$

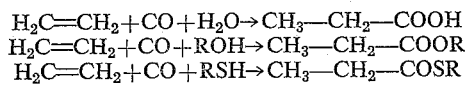

$$R-CH=CH_2+2CO+H_2O \rightarrow R-CH_2-CH_2-CHO+CO_2$$

For the production of ketones, the following equations apply:

$$CO+H_2O \rightarrow CO_2+H_2$$
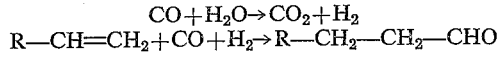
$$2R-CH=CH_2+CO+H_2 \rightarrow R-CH_2-CH_2-CO-CH_2-CH_2.R$$

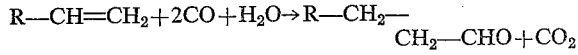

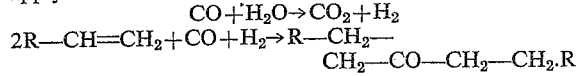
$$2R-CH=CH_2+2CO+H_2O=R-CH_2-CH_2-CO-CH_2-CH_2.R+CO_2$$

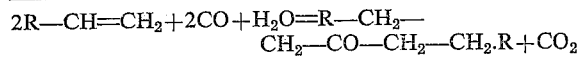

The above equations indicate that 1 mol of carbon dioxide is formed per mol of ketone.

One object of this invention is the conversion of ethylene, propylene, and butylene with carbon monoxide into oxygenated organic compounds comprising predominantly ketones and acids. This, and still further objects will become apparent from the following description:

It has now been found that if carbon monoxide is added to ethylene, propylene or butylene using as catalyst an aqueous solution of sulfates of metals of the 8th group of the periodic system which are free from metallic halogen compounds, then ketones and acids are preferably formed. Theoretically, 1 mol CO is added per mol of the olefin being processed. However, when performing the process, an excess of 50 to 150% of the theoretically required amount of carbon monoxide must be used. An aqueous solution of cobalt sulfate and/or iron sulfate is preferably used as the catalyst. In addition, this catalyst solution may contain soluble sulfates of elements of the 2nd group of the periodic system, especially magnesium sulfate or zinc sulfate. Of particular advantage is the use of aqueous catalyst solutions which contain magnesium sulfate in addition to cobalt sulfate and/or iron sulfate. The concentration of these solutions is chosen such that cobalt in amounts of 5 to 6 grams of Co is dissolved per liter. The amount added of magnesium sulfate is such that 3–30 grams of Mg are present per liter of solution. Zinc sulfate is used in amounts of 5–20 grams per liter of solution.

The formation of the ketones in accordance with the invention does not proceed with the evolution of an equivalent amount of carbon dioxide. According to Example 1, 12.6 mols CO were added while 17.6 mols had been charged. Since 3.37 mols CO and 0.87 mol $C_2H_4$ were still present in the residual gas, 12.6 mols CO were consumed per 8.03 mols ethylene. Only 0.61 mol $CO_2$ were thereby formed while 8.03 mols $CO_2$ were obtained in the known processes. The amount of carbon dioxide formed during the reaction apparently corresponds to the by-products formed in the reaction. Thus, as may be seen from the following example, only about 0.61 mol of carbon dioxide are obtained in the residual gas, while 1.87 mols of diethyl ketone are simultaneously formed. As by-products 0.19 mol of propionic aldehyde, 0.2 mol of propyl alcohol and 0.23 mol of propyl propionate, i. e., a total of 0.62 mol of by-product is formed, which corresponds to the $CO_2$ evolved.

In contrast to the known catalytic addition of carbon monoxide and hydrogen to olefinic double bonds, the process in accordance with the invention requires higher pressure and higher temperatures.

The reaction pressure should be maintained at about 150–1,000 kilograms per square centimeter and preferably at a pressure between 200 and 250 kilograms per square centimeter.

The temperature of the conversion should be maintained at about 100–220° C., and preferably at about 190–200° C. These conversion temperatures range about 30–50° C. higher than those usual for the catalytic addition of water gas to olefins, i. e., the so-called oxo-synthesis.

As compared with the catalytic addition of water gas to olefins, the reaction time must be increased about tenfold. The reaction products formed by the conversion chiefly consists of ketones and acids. When processing ethylene in accordance with the invention, for example, 43% of ketones and 43.3% of acids are formed in addition to small quantities of aldehydes (3%), alcohols (3.2%), and esters (7.2%) which are formed as by-products. The residual gas contains only so much carbon dioxide as approximately corresponds to the by-products formed.

The following examples are given by way of illustration and not limitation:

*Example 1*

Two liters of a solution containing per liter 80 gms. of $CoSO_4.7H_2O$, 80 gms. $FeSO_4.7H_2O$, and 80 gms. $MgSO_4.7H_2O$ were sucked into an evacuated stirring autoclave of 9 liters capacity. Moreover, 1 liter of toluene was sucked in. Thereafter, 250 gms. of ethylene (8.9 mols) were introduced under pressure. In doing so, the pressure increased to 48 atmospheres gauge. 244 gms. of CO (about 8.7 mols) were then introduced under pressure, thereby increasing the total pressure to 88 atmospheres gauge. Thereafter, the contents of the autoclave was heated to 192° C., resulting in a rise of pressure to 163 atmospheres gauge. After a stirring time of 4 hours, the manometer, at an operating temperature of 192° C., still showed a pressure of 162 atmospheres gauge. This indicated that a marked gas absorption had not yet taken place. After cooling to 20° C., the gas pressure had dropped to 82 atmospheres gauge. Therefore, a quantity of gas which corresponded to a reduction in pressure by 6 kilograms per square centimeter had been absorbed.

Pure carbon monoxide was then introduced under pressure until a pressure of 138 atmospheres gauge at 20° C. was obtained and the autoclave was heated with the stirrer running. At 197° C., a gas absorption of 52 kilograms per square centimeter was observed after 10 hours. A total of 6+52=58 kilograms per square centimeter of gas corresponding to about 12.6 mols of gas had been absorbed while about 17.6 mols of carbon monoxide had been introduced.

The analysis of the residual gas indicated that the following reactants and products were present:

0.87 mol $C_2H_4$
3.37 mols CO
0.61 mol $CO_2$

Thus, 90.2% of the ethylene charged and 81% of the carbon monoxide had been worked up.

The following liquid products were obtained:

3350 cc. in two layers (3000 cc. charge)
1200 cc. upper layer (charge of 1000 cc. of toluene)
2150 cc. lower layer (charge of 2000 cc. of aqueous salt solution)

Processing of the liquid products resulted in
11 gms. propionic aldehyde
12 gms. propanol
27 gms. propyl propionate
163 gms. propionic acid
161 gms. pentanone 374 gms. from 250 gms. of ethylene

*Example 2*

The pressure vessel used according to Example 1 was charged with 150 cc. of benzene and 2000 cc. of catalyst solution. The catalyst solution contained per liter 15 gms. of cobalt and 15 gms. of zinc in the form of sulfates. The free gas space of the pressure vessel was purged three times with nitrogen and then evacuated. Then 500 gms. of butene from a pressure-resistant stock bottle consisting of a mixture of butene-1 and butene-2 were forced into the vessel by means of carbon monoxide. The remaining space of the pressure vessel was filled with cold CO gas until a pressure of 130 kg./sq.cm. was reached. After heating of the pressure vessel to 200° C., a pressure of 233 kg./sq.cm. was observed.

After a reaction time of 17 hours, the gas pressure had dropped by 35 kg./sq.cm. to 198 kg./sq.cm. A sample taken from the gas contained in the pressure vessel had the following composition:

| | Percent by volume |
|---|---|
| CO | 83.2 |
| $CO_2$ | 7.4 |
| $C_nH_m$ | 1.3 |
| $O_2$ | 1.1 |
| $H_2$ | 0.5 |
| $C_nH_{2n+2}$ | 1.4 |
| $N_2$ | 5.1 |

After the termination of the conversion, the reaction product consisted of 1835 gms. of an upper oily layer. This layer was hydrated for 2 hours at 210° C. with 300 grams of water. This resulted in the following products:

| | Percent by weight |
|---|---|
| Dibutyl ketone | 10.2 |
| Butene carboxylic acids | 8.5 |
| Pentanal | 41.0 |
| Pentanol | 25.2 |
| Pentyl-pentane acid ester | 5.3 |
| Decenal | 4.0 |
| Higher polymeric compounds | 5.8 |

*Example 3*

Propylene in amount of 400 grams was treated with carbon monoxide with the addition of 1500 cc. benzene using the apparatus and the catalyst solution used according to Example 1. The reaction temperature amounted to 190° C. After a reaction time of 12 hours and subsequent hydration with water at 210° C., the following reaction products were obtained:

| | Percent by weight |
|---|---|
| Heptanone | 18.7 |
| Butyric acid | 14.4 |

The balance of the reaction product comprised isobutyraldehyde and normal butyraldehyde, butyl alcohols, butyl butyrate, isooctanal and higher polymers.

We claim:

1. Process for the catalytic addition of carbon monoxide and an olefinic hydrocarbon for the production of organic oxygenated compounds which comprises contacting a hydrocarbon selected from the group consisting of ethylene, propylene and butylene with carbon monoxide in the presence of a diluent selected from the group consisting of benzene and toluene and an aqueous catalyst solution of cobalt sulfate, free of metallic halogen compounds and containing an additional sulfate selected from the group consisting of iron sulfate, magnesium sulfate and zinc sulfate, at a temperature between 190° and 200° C. and at a pressure between 200 and 250 kilograms per square centimeter and recovering the oxygenated compounds formed.

2. Process according to claim 1, in which said contacting is effected with an amount of carbon monoxide which is 50–150% in excess of the stoichiometrically required quantity.

References Cited in the file of this patent

UNITED STATES PATENTS

| 2,448,368 | Gresham et al. | Aug. 31, 1948 |
| 2,510,105 | Hedberg | June 6, 1950 |
| 2,577,208 | Reppe | Dec. 4, 1951 |
| 2,593,440 | Hagemeyer | Apr. 22, 1952 |